United States Patent
Naito et al.

(10) Patent No.: US 6,671,164 B2
(45) Date of Patent: Dec. 30, 2003

(54) NIOBIUM POWDER, SINTERED BODY USING THE POWDER, AND CAPACITOR USING THE SAME

(75) Inventors: Kazumi Naito, Chiba (JP); Nobuyuki Nagato, Saitama (JP)

(73) Assignee: Showa Denko Kabushiki Kaisha, Tokyo (JP)

(*) Notice: Subject to any disclaimer, the term of this patent is extended or adjusted under 35 U.S.C. 154(b) by 0 days.

(21) Appl. No.: 09/840,274

(22) Filed: Apr. 24, 2001

(65) Prior Publication Data

US 2002/0075629 A1 Jun. 20, 2002

Related U.S. Application Data

(60) Provisional application No. 60/232,829, filed on Sep. 15, 2000.

(30) Foreign Application Priority Data

Apr. 24, 2000 (JP) ........................................ P2000-122672

(51) Int. Cl.⁷ .......................... B32B 1/00; C22C 27/02; H01G 4/10; H01G 4/18
(52) U.S. Cl. .................... 361/311; 428/411.1; 428/403; 420/425; 75/252; 361/323; 361/321.5
(58) Field of Search .......................... 420/425; 75/252; 428/403, 404, 411.1; 361/311, 323, 321.5

(56) References Cited

U.S. PATENT DOCUMENTS

| | | |
|---|---|---|
| 4,084,965 A | 4/1978 | Fry |
| 4,149,876 A | 4/1979 | Rerat |
| 4,954,169 A | 9/1990 | Behrens |
| 4,964,906 A | 10/1990 | Fife |
| 5,448,447 A | 9/1995 | Chang |
| 6,051,044 A * | 4/2000 | Fife ........................... 361/528 |
| 6,115,235 A * | 9/2000 | Naito ........................... 361/303 |
| 6,171,363 B1 | 1/2001 | Shekhter et al. |

FOREIGN PATENT DOCUMENTS

| | | |
|---|---|---|
| GB | 1 219 748 | 1/1971 |
| JP | 60-121207 | 6/1985 |
| JP | 01-242702 | 9/1989 |
| JP | 02-039417 | 2/1990 |
| JP | 03-150822 | 6/1991 |
| JP | 05-009790 | 1/1993 |
| JP | 10-242004 | 9/1998 |
| WO | WO 98/19811 | 5/1998 |
| WO | WO 9838660 A1 * | 9/1998 |

OTHER PUBLICATIONS

"Reactions During Sintering of Niobium Powder from Aluminothermic Reduction Product," R&HM, Dec. 1985, vol. 4, pp. 189–194.

"The Influence of Gas Atmospheres on the First-Stage Sintering of High-Purity Niobium Powders", Metallurgical Transactions, Jun. 1984, vol. 15, pp. 1111–1116.

* cited by examiner

Primary Examiner—Ramsey Zacharia
(74) Attorney, Agent, or Firm—Sughrue, Mion, PLLC

(57) ABSTRACT

An object of the present invention is to provide a niobium powder for producing a capacitor exhibiting excellent reliability; a sintered body formed from the powder; and a capacitor including the sintered body. Even when niobium exhibiting high affinity to oxygen is employed, the niobium powder is obtained by regulating the amount of oxygen contained in the powder. By employing niobium powder which has undergone partial oxidation and partial nitridation, in which the mass ratio of the nitrogen content to the oxygen content is about 1/45 or more, a capacitor exhibiting excellent reliability can be obtained.

11 Claims, No Drawings

NIOBIUM POWDER, SINTERED BODY USING THE POWDER, AND CAPACITOR USING THE SAME

CROSS REFERENCE TO RELATED APPLICATIONS

This application is an application filed under 35 U.S.C. §111(a) claiming benefit pursuant to 35 U.S.C. §119(e)(1) of the filing date of Provisional Application No. 60/232,829 filed Sep. 15, 2000 pursuant to 35 U.S.C. §111(b).

FIELD OF THE INVENTION

The present invention relates to niobium powder employed for producing a capacitor exhibiting excellent reliability; a sintered body formed from the powder; and a capacitor comprising the sintered body.

BACKGROUND OF THE INVENTION

Capacitors employed in electronic apparatuses such as cellular phones and personal computers desirably have small size and high capacitance. Among such capacitors, a tantalum capacitor has been widely employed, since the tantalum capacitor has high capacitance relative to its size and exhibits excellent performance. Generally, in the tantalum capacitor, a sintered body of tantalum powder is employed as a positive electrode. Therefore, in order to increase the capacitance of the capacitor, the mass of the sintered body must be increased.

However, when the mass of the sintered body is increased, the capacitor unavoidably becomes large, and therefore fails to satisfy the demand for small size. In order to solve such a problem, a capacitor comprising a sintered body of a powder material having a dielectric constant higher than that of tantalum has been studied. Niobium is an example of such a material having a high dielectric constant.

Japanese Patent Application Laid-Open (kokai) No. 55-157226 discloses a production process for a sintered element employed in a capacitor, in which niobium agglomeration and niobium powder having a particle size of 2.0 μm or less are press-shaped and sintered. The resultant sintered body is cut into small pieces, a lead portion is connected to each piece, and the resultant piece is sintered again. However, the publication does not disclose capacitor characteristics in detail.

U.S. Pat. No. 4,084,965 discloses a capacitor formed from niobium powder having a particle size of 5.1 μm, which is obtained through pulverization of a hydrogenated niobium ingot. However, a niobium sintered body has a higher leakage current (LC) than LC of a tantalum sintered body, and thus may fail to be practically useful.

Although niobium exhibits poor leakage current characteristics, the present inventors have proposed that the leakage current of niobium can be reduced when the niobium is subjected to, for example, partial nitridation, (see Japanese Patent Application Laid-Open (kokai) No. 10-242004, U.S. Pat. No. 6,115,235). In order to further reduce the leakage current of niobium when a sintered body of niobium is produced, the sintering temperature is elevated. However, when the sintering temperature is elevated, the product (hereinafter the product will be referred to as "CV") of capacitance per unit mass of the produced sintered body and formation voltage during production of a dielectric on the sintered body decreases. Therefore, obtaining a well-balanced niobium sintered body having high CV and low LC is difficult. Meanwhile, when a capacitor is produced from a niobium sintered body obtained to attain only a high CV, the capacitor encounters the problem in that LC is especially high.

Since the affinity of niobium to oxygen is higher than that of tantalum to oxygen, niobium contains a large amount of portions which are oxidized at room temperature. As described below, when niobium is sintered and the resultant sintered body is employed as one electrode of a capacitor, the aforementioned oxidized portions adversely affect a dielectric of the capacitor, possibly resulting in poor reliability of the capacitor. For example, when voltage is applied to the capacitor at room temperature after the capacitor is subjected to a high-temperature load test, which is an acceleration test for evaluating reliability of the capacitor, spike noise may be generated. In the case in which the capacitor is provided on a circuit substrate, generated noise may adversely affect other electronic parts on the circuit board when the capacitor is used for a prolonged period of time. Therefore, the capacitor involves some problems when it is used.

In view of the foregoing, an object of the present invention is to provide a niobium powder for producing a capacitor exhibiting excellent reliability; a sintered body formed from the powder; and a capacitor comprising the sintered body, even when niobium exhibiting high affinity to oxygen is employed, by regulating the amount of oxygen contained in the powder.

SUMMARY OF THE INVENTION

The present inventors have performed extensive studies on oxygen contained in niobium powder, and have developed a niobium powder capable of forming a sintered body for producing a capacitor exhibiting excellent reliability. The present invention has been accomplished on the basis of this development. Accordingly, the present invention provides the following embodiments:

(1) niobium powder comprising niobium, nitrogen and oxygen, which has undergone partial oxidation and partial nitridation, wherein the mass ratio of the content of nitrogen in the powder to that of oxygen in the powder is about 1/45 or more;

(2) niobium powder according to (1) above, wherein the nitrogen content is about 300 mass ppm or more and about 9,000 mass ppm or less;

(3) niobium powder according to (1) or (2) above, wherein the mean particle size of the powder is about 0.05 μm or more and about 3 μm or less;

(4) granulated niobium powder obtained through granulation of niobium powder as described in (3) above;

(5) a sintered body formed from niobium powder as described in any one of (1) through (4) above;

(6) a capacitor comprising a sintered body as described in (5) above serving as a first electrode, a dielectric formed thereon, and a second electrode;

(7) a capacitor according to (6) above, wherein the dielectric is niobium oxide;

(8) a capacitor according to (7) above, wherein the niobium oxide is formed through electrolytic oxidation;

(9) a capacitor according to (6) above, wherein the second electrode is formed from at least one material (compound) selected from among an electrolyte, an organic semiconductor, and an inorganic semiconductor;

(10) a capacitor according to (6), wherein the second electrode is formed from an organic semiconductor, and the organic semiconductor is at least one semiconductor selected from the group comprising of an organic semiconductor comprising benzopyrroline tetramer and chloranyl, an organic semiconductor predominantly comprising tetrathiotetracene, an organic semiconductor predominantly comprising tetracyanoquinodimethane, and an organic semiconductor predominantly comprising a conductive polymer in which a dopant is doped in a polymer including two or more repeating units represented by the following formula (1) or (2):

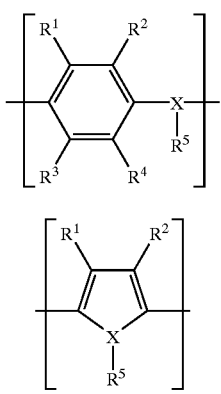

(1)

(2)

wherein each of $R^1$ through $R^4$, which may be identical to or different from one another, represents hydrogen, a C1–C6 alkyl group, or a C1–C6 alkoxy group; X represents an oxygen, sulfur, or nitrogen atom; $R^5$, which is present only when X is a nitrogen atom, represents hydrogen or a C1–C6 alkyl group; and $R^1$ and $R^2$, and $R^3$ and $R^4$ may be bonded to each other to form a cyclic structure; and

(11) a capacitor according to (9) above, wherein the organic semiconductor is at least one species selected from among polypyrrole, polythiophene, and a substituted derivative thereof.

DESCRIPTION OF THE PRESENT INVENTION

As described above, in the niobium powder of the present invention, the mass ratio of the nitrogen content to the oxygen content must be about 1/45 or more, preferably about 1/40 or more, more preferably about 1/30 or more. When the mass ratio falls outside the above range, a capacitor produced from the niobium powder fails to exhibit excellent reliability. For example, when voltage is applied to the capacitor at room temperature after the capacitor is subjected to a high-temperature load test, which is an acceleration test for evaluating reliability of the capacitor, spike noise may be generated (see Comparative Examples in Table 2). Generation of spike noise is not preferable in view of the reliability of the capacitor.

Therefore, in the present invention, it is important to regulate the mass ratio of the nitrogen content to the oxygen content to about 1/45 or more in the niobium powder which has undergone partial oxidation and partial nitridation. Nitrogen contained in the niobium powder is not attributed to nitrogen adsorbed onto the powder or nitrogen physically doped in the powder, but is attributed to nitrogen incorporated into the powder through chemical nitridation. As used herein, the term the "nitrogen content" refers to the amount of nitrogen contained in the niobium powder through nitridation.

In general, the nitrogen content is hundreds of mass ppm (hereinafter "mass ppm" will be abbreviated as "ppm") to tens of thousands of ppm. When a dielectric is formed on a sintered body produced from the niobium powder and then the leakage current of the resultant product is measured in a phosphoric acid aqueous solution, the nitrogen content is substantially about 300 ppm or more and about 9,000 ppm or less, preferably about 500 ppm or more and about 7,000 ppm or less in order attain a low leakage current.

Nitridation of niobium powder is carried out through a liquid nitridation method, an ion nitridation method, or a gas nitridation method. These methods may be carried out singly or in combination. Of these, a gas nitridation method in which niobium powder is nitridized in a nitridation gas atmosphere is preferable, since the apparatus for the method is simple and is easily operated. For example, such a gas nitridation method can be carried out by allowing the niobium powder to stand in a nitrogen atmosphere.

When niobium powder is allowed to stand in a nitridation atmosphere at about 2,000° C. or lower for tens of hours, the niobium powder will comprise the intended amount of nitrogen. When nitridation of niobium powder is carried out at a high temperature, the nitridation time can be shortened. The nitrogen content of niobium powder to be nitridized can be controlled under the conditions of nitridation temperature and nitridation time which are determined through pretests, after the particle size and the oxygen content of the niobium powder are measured.

Not only niobium powder, but also granulated niobium powder can be subjected to the aforementioned nitridation.

An embodiment for forming the sintered body of the present invention will next be described.

Niobium powder serving as a raw material for the sintered body preferably has a mean particle size of about 0.05 $\mu$m or more and less than about 3$\mu$ or less. In order to increase capacitance per unit weight of the sintered body when a capacitor is produced from the sintered body after the specific surface area of the sintered body is increased, the mean particle size of the niobium powder is more preferably about 0.05 $\mu$m or more and less than about 1 $\mu$m. When a capacitor is produced from the sintered body formed from the niobium powder having a mean particle size of less than about 0.05 $\mu$m, pores in the sintered body become very small, and thus the below-described second electrode (negative electrode material) may be difficult to impregnate into the sintered body. In contrast, when the mean particle size of the powder is about 3 $\mu$m or more, capacitance per unit weight of the sintered body becomes low, which is not preferable.

As used herein, in the case of the niobium powder, the term "mean particle size" refers to $D_{50}$ value (particle size value in which the cumulative mass % corresponds to 50 mass %), which is measured using a particle size distribution measurement apparatus (product name: Microtrac). The niobium powder having the aforementioned mean particle size may be obtained by means of pulverization of a sodium-reduced compound of potassium fluoroniobate, pulverization of a hydrogenated niobium ingot and dehydrogenation thereof, or carbon-reduction of niobium oxide. For example, when the niobium powder is obtained through pulverization of a hydrogenated niobium ingot and dehydrogenation thereof, the degree of hydrogenation of a niobium ingot, and the time for pulverization of the ingot using a pulverization apparatus are controlled to obtain the niobium powder having the desired mean particle size.

The thus-obtained niobium powder may contain impurities attributed to the raw material, the reducing agent, and the employed apparatus. A typical impurity is an element M (examples of M include iron, nickel, cobalt, silicon, sodium, potassium, and magnesium). The aforementioned niobium powder may be washed with an alkali or an acid, preferably at least one acid selected from hydrofluoric acid, nitric acid, sulfuric acid, and hydrochloric acid, more preferably nitric acid with hydrogen peroxide. These reagents may be used sequentially or in combination to wash the powder repeatedly for removal of impurities.

For example, the powder may be sufficiently washed with sulfuric acid, residual sulfuric acid is neutralized by use of an alkali, and then the powder is repeatedly washed with water. When nitric acid is employed together with hydrogen peroxide for washing the powder, oxidation of the powder by nitric acid can be prevented, which is advantageous. The powder may also be washed by means of another method. For example, the powder is stirred in the above-described reagent for a suitable period of time; i.e., until the impurity content reaches a predetermined value or less, and the powder is separated from the reagent by stirring.

When the niobium powder containing the element M as an impurity is employed for producing a capacitor, the element M may migrate into a dielectric layer. Therefore, when voltage is applied to the capacitor, the element M may cause abnormal accumulation of electric charge, and the leakage current of the capacitor may become large. In the niobium powder, when the amount of each of the elements M is about 100 ppm or less or the total amount of the elements M is about 350 ppm or less, the effect on the aforementioned dielectric layer can be reduced. In order to further decrease the leakage current, the amount of each of the elements M is preferably about 70 ppm or less, more preferably about 30 ppm or less. Also, to further decrease the leakage current, the total amount of the elements M is preferably about 300 ppm or less, more preferably about 200 ppm or less.

The niobium powder according to the present invention has the aforementioned mean particle size and undergoes partial oxidation and partial nitridation. The lower the oxygen content of the niobium powder, the more excellent the performance exhibited by the resultant capacitor. As described above, the niobium powder is naturally oxidized in air at room temperature, and thus the niobium powder having the mean particle size specified in the present invention contains oxygen in an amount of usually about 5,000 to about 60,000 ppm. Therefore, oxidation of the niobium powder of the present invention is not necessarily intentional.

In the present invention, the niobium powder may be employed after the niobium powder is formed into granules having an appropriate shape. Alternatively, the granulated niobium powder may be employed by mixing with an appropriate amount of non-granulated niobium powder. The niobium powder may be granulated through a conventionally-known method. Examples include a method in which non-granulated niobium powder is allowed to stand in a vacuum at high temperature for agglomeration, and then the resultant agglomerations are pulverized; and a method in which non-granulated niobium powder is mixed with a specific binder, and the resultant mixture is pulverized. In the case in which the latter method is carried out, a solvent may be employed when niobium powder is kneaded with a binder, if necessary. In this case, after the niobium powder is kneaded with the binder, the resultant mixture is dried and then pulverized.

Typical examples of the binder include polyvinyl alcohol and acrylic resins. The solvent which may be employed is selected from among acetone, alcohols, esters such as butyl acetate, water, and the like. The thus-granulated niobium powder has a mean particle size of about 300 $\mu$m or less, preferably about 200 $\mu$m or less, more preferably about 1 to about 200 $\mu$m.

The niobium powder is sintered to thereby produce the sintered body according to the present invention. An example production process for the sintered body is described below. The niobium powder is subjected to pressure-shaping into a predetermined form, and then heated at about 500 to about 2,000° C., preferably about 900 to about 1,500° C., more preferably about 900 to about 1,250° C., under a reduced pressure of about 133 Pa to about $133 \times 10^{-6}$ Pa for several minutes to several hours.

Production of a capacitor element of the present invention will next be described.

Firstly, there is prepared a lead wire formed from a valve action metal, such as niobium or tantalum of appropriate shape and length. When the niobium powder is subjected to the aforementioned pressure-shaping, a portion of the lead wire is inserted into the resultant shaped body to make the lead wire a drawing lead of the aforementioned sintered body.

A capacitor including the aforementioned sintered body serving as a first electrode, a second electrode, and a dielectric sandwiched by these electrodes may be produced. The dielectric of the capacitor is preferably a dielectric formed from niobium oxide. For example, the niobium oxide dielectric is easily obtained by subjecting the niobium sintered body serving as the first electrode to formation in an electrolyte. Formation of the niobium electrode in the electrolyte is typically performed by use of an aqueous solution of a protic acid; for example, an about 0.1% aqueous solution of phosphoric acid or sulfuric acid. When the niobium oxide dielectric is obtained through formation of the niobium sintered body in the electrolyte, the capacitor of the present invention serves as an electrolytic capacitor and the niobium sintered body becomes a positive electrode.

No particular limitation is imposed on the material of the second electrode of the capacitor of the present invention. For example, there may be employed at least one material (compound) selected from among electrolytes, organic semiconductors, and inorganic semiconductors, all of which are known in the aluminum electrolytic capacitor industry. Specific examples of electrolytes include a solution mixture of ethylene glycol and dimethylformamide containing isobutyltripropylammonium borotetrafluoride in an amount of about 5 mass %; and a solution mixture of ethylene glycol and propylene carbonate containing tetraethylammonium borotetrafluoride in an amount of about 7 mass %.

Specific examples of organic semiconductors include an organic semiconductor comprising benzopyrroline tetramer and chloranyl; an organic semiconductor predominantly comprising tetrathiotetracene; an organic semiconductor predominantly comprising tetracyanoquinodimethane; and an organic semiconductor predominantly comprising a conductive polymer in which a dopant is doped in a polymer including two or more repeating units represented by the following formula (1) or (2):

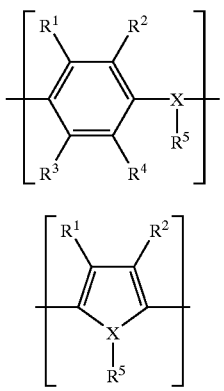

wherein each of R¹ through R⁴, which may be identical to or different from one another, represents hydrogen, a C1–C6 alkyl group, or a C1–C6 alkoxy group; X represents an oxygen, sulfur, or nitrogen atom; R⁵, which is present only when X is a nitrogen atom, represents hydrogen or a C1–C6 alkyl group; and R¹ and R², and R³ and R⁴ may be bonded to each other to form a cyclic structure. The dopant is not particularly limited and may be any known dopant.

Specific examples of inorganic semiconductors include an inorganic semiconductor predominantly comprising lead dioxide or manganese dioxide; and an inorganic semiconductor comprising triiron tetroxide. These semiconductors may be employed alone or in combination of two or more.

Examples of polymers comprising two or more repeating units represented by the formula (1) or (2) include polyaniline, polyoxyphenylene, poly(phenylene sulfide), polythiophene, polyfuran, polypyrrole, polymethylpyrrole, substituted derivatives thereof, and copolymers thereof. Of these, polypyrrole, polythiophene, or a substituted derivative thereof (e.g., poly(3,4-ethylenedioxythiophene)) is preferable.

When the aforementioned organic semiconductor or inorganic semiconductor having a conductivity of $10^{-2}$–$10^{3}$ S·cm$^{-1}$ is employed, the impedance of the produced capacitor further decreases and the capacitance of the capacitor may be further increased at high frequency.

When the second electrode is in solid form, a conductive layer may be provided on the electrode in order to improve the electric contact between the electrode and an externally-drawn lead (e.g., a lead frame).

The conductive layer may be formed through, for example, solidification of a conductive paste, plating, metal deposition, or formation of heat resistant conductive resin film. Preferred examples of conductive pastes include a silver paste, a copper paste, an aluminum paste, a carbon paste, and a nickel paste. These pastes may be employed alone or in combination of two or more. When two or more pastes are employed, the pastes may be mixed together to form one layer, or the respective layers of the pastes may be laminated on one another. After such a conductive paste is applied onto the electrode, the electrode is allowed to stand in air or is heated to solidify the paste. Examples of plating include nickel plating, copper plating, silver plating, and aluminum plating. Examples of metals for deposition include aluminum, nickel, copper, and silver.

Specifically, for example, an aluminum paste layer and a silver paste layer are successively formed on the second electrode, and then encapsulated with a material such as an epoxy resin to produce a capacitor. The capacitor may contain a niobium or tantalum lead, which is sintered together with the niobium sintered body or welded to the sintered body after sintering.

A variety of capacitor products for different uses can be produced from the capacitor of the present invention having the aforementioned structure; for example, by encapsulating the capacitor in a resin mold, a resin case, or a metallic case, by dipping the capacitor in a resin, or by coating the capacitor with a laminate film.

When the second electrode is in liquid form, the capacitor including the aforementioned electrodes and the dielectric is placed in, for example, a can which is electrically connected to the second electrode to produce a capacitor. In such a case, the electrode of the niobium sintered body is led to the outside via the aforementioned niobium or tantalum lead, and the lead is insulated from the can by use of a material such as insulating rubber.

As described above, when a sintered body is formed from the niobium powder according to the present invention and a capacitor is produced from the sintered body, the produced capacitor exhibits excellent reliability.

EXAMPLES

The present invention will next be described in more detail by way of Examples, which should not be construed as limiting the invention thereto. Unless otherwise indicated herein, all parts, percents, ratios and the like are by weight.

The amounts of nitrogen and oxygen comprised in the powder were measured by Oxygen-Nitrogen-Amount Measuring Apparatus (product of LECO). The ratio of the amount of nitrogen to the separately measured mass of the powder and the ratio of the amount of oxygen to the separately measured mass of the powder were determined as the nitrogen content and the oxygen content, respectively.

The capacitance of a sintered body was measured as follows. A sintered body was subjected to a 0.1% phosphoric acid aqueous solution at 80° C. for 200 minutes to form a dielectric on the sintered body. Subsequently, the resultant sintered body was immersed in a 30% sulfuric acid aqueous solution at room temperature, and an LCR-Meter (product of Hewlett Packard) was connected between the sintered body and a tantalum electrode placed in the sulfuric acid solution. The capacitance as measured at 120 Hz was determined to be the capacitance of the sintered body.

The leakage current (LC) of a sintered body was measured as follows. DC voltage equivalent to 70% of the formation voltage during preparation of a dielectric was applied for three minutes at room temperature between the sintered body immersed in a 20% phosphoric acid aqueous solution and an electrode placed in a phosphoric acid aqueous solution. After voltage application, the current was measured as the leakage current of the sintered body.

The capacitance of a capacitor formed into a chip was measured by use of an LCR-Meter (product of HP) at room temperature and 120 Hz. The leakage current of the capacitor chip was measured after a rated voltage was applied to the chip for one minute.

Spike noise of a capacitor was measured after the capacitor was subjected to a high-temperature load test in which rated voltage was applied to the capacitor and the capacitor was allowed to stand at 105° C. for 2,000 hours. Spike noise was verified by the existence of noise, which was suddenly generated in data of the leakage current recorded continuously on a sheet for five minutes while rated voltage was applied to the capacitor at room temperature. The capacitance and leakage current of the capacitor are on the basis of the average value of 20 capacitors for each Example.

Examples 1 through 4 Comparative Example 1

Potassium fluoroniobate (300 g) which had been sufficiently dried at 80° C. in a vacuum, and sodium (amount by mol of ten times that of potassium fluoroniobate) were placed in a nickel-made crucible, and the mixture was allowed to react at 1,000° C. for 20 hours under argon for reduction. After completion of the reaction, the reduced product was cooled, and sequentially washed with water, 95% sulfuric acid, and water, and then dried in a vacuum. The dried product was further pulverized for 35 hours by use of a ball mill including an alumina pot and silica-alumina balls contained therein. The thus-pulverized product was immersed in a solution mixture of 50% nitric acid and 10% hydrogen peroxide (3:2 (mass ratio)) by stirring to remove an impurity introduced during pulverization. The resultant product was sufficiently washed with water so that the pH of washing water reached 7, and then dried in a vacuum to obtain niobium powder having a mean particle size of 2.9 $\mu$m.

Subsequently, the niobium powder was allowed to stand at 1,100° C. and at a reduced pressure of $1.33 \times 10^{-4}$ Pa for 30 minutes. Thereafter, the niobium powder was pulverized in water in a nitrogen atmosphere at room temperature by use of a wet-type pulverization apparatus (product name: Ato-liter) to produce granules having a mean particle size of 150 $\mu$m. The mean particle size was measured by use of an automatic sieving apparatus.

The oxygen content of the granules was 12,000 ppm. The granules were placed in a vessel, and while nitrogen was passed through the vessel at a flow rate of 500 ml/minute, the granules were allowed to stand at the temperature shown in Table 1 for three hours for nitridation. The measured nitrogen content of the granules and the mass ratio of the nitrogen content to the oxygen content are shown in Table 1. In each Example, the niobium granules which had undergone nitridation under different conditions were shaped with a niobium wire (0.29 mm$\phi$) ("mm$\phi$" means a diameter in mm) into a compact having approximate dimensions of 0.34 cm×0.18 cm×0.44 cm (about 85 mg). One side of the niobium wire (6 mm) was drawn outside of the compact, and the other side (about 3.5 mm) was inserted in the compact.

Subsequently, the compact was allowed to stand at a reduced pressure of $4 \times 10^{-4}$ Pa at 1,250° C. for 30 minutes to produce a sintered body thereof. The sintered body was subjected to an application of 20 V in a 0.1% phosphoric acid aqueous solution at 80° C. for 200 minutes to form a niobium oxide dielectric layer on a surface of the sintered body.

Thereafter, the capacitance of the sintered body in 30% sulfuric acid and the leakage current (LC) thereof after application of voltage at 14 V for three minutes at room temperature in a 20% phosphoric acid aqueous solution were measured. The results are shown in Table 1.

Similar sintered bodies (20 for each Example) were produced, and each sintered body was treated under conditions similar to those described above, excluding formation time (the formation time was changed to 1,000 minutes) to form a niobium oxide dielectric layer on the sintered body. Subsequently, the resultant sintered body was immersed in a solution mixture of a 30% lead acetate aqueous solution and a 35% ammonium persulfate aqueous solution (1:1 (by volume)) and allowed to react at 40° C. for one hour. This procedure was carried out 20 times to form, on the dielectric oxide film, a layer containing a lead dioxide-lead sulfate mixture (lead dioxide content: 94 mass %) serving as a second electrode. On the second electrode, a carbon paste layer and a silver paste layer were successively formed. The resultant element was connected to a lead frame, and the entire element was encapsulated with an epoxy resin to produce a chip capacitor. Table 2 shows the capacitance and LC (measured after application of voltage at 6.3 V for one minute) of the capacitor, and the spike noise generation ratio after a high-temperature load test.

Examples 5 and 6, Comparative Example 2

A niobium rod (100 mm$\phi$, 300 g) was placed into a reactor made of SUS 304. After the reactor was evacuated to about $8 \times 10^{-2}$ Pa for degassing, the temperature of the reactor was elevated to 800° C., and hydrogen was fed to the reactor. Hydrogen was further introduced at 350° C. for 50 hours. After cooling, a portion of the hydrogenated niobium ingot was pulverized for 5 hours in a one-liter pot made of SUS 304 containing iron balls. The pulverized product was placed into the above-described reactor made of SUS 304 and further hydrogenated under the above conditions. The thus-hydrogenated product was mixed with water to prepare a 20 vol. % slurry. The slurry and zirconia balls were placed in a wet-type pulverization apparatus made of SUS 304 (product name: Ato-liter), and the mixture was wet-pulverized in the apparatus.

Subsequently, the pulverized product was sequentially washed with 95% sulfuric acid, water, a mixture of 30% hydrofluoric acid and 50% nitric acid (1:1 (mass ratio)), and water, and dried in vacuum to remove an impurity.

The mean particle size of the dried pulverized product was 0.7 $\mu$m. Subsequently, the resultant niobium powder was allowed to stand at 950° C. and at a reduced pressure of $1.33 \times 10^{-4}$ Pa for 30 minutes. Thereafter, the niobium powder was pulverized in a manner similar to that described in Example 1 to produce granules having a mean particle size of 130 $\mu$m. The oxygen content of the granules was 30,000 ppm.

Subsequently, the granules were allowed to stand for three hours at the temperature shown in Table 1 for nitridation at a nitrogen flow rate similar to that described in Example 1. Moreover, the procedure of Example 1 was repeated, except that the sintering temperature was changed to 1,050° C. to carry out shaping, sintering, and formation. The capacitance and LC of the resultant sintered body were measured. The results are shown in Table 1. Similar sintered bodies (20 for each Example) were produced in a manner similar to that described above, and each sintered body was treated under conditions similar to those described above to form a niobium oxide dielectric layer on the sintered body.

Subsequently, in order to form a second electrode on the dielectric layer, the sintered body was exposed to pyrrole vapor which was mixed with nitrogen flowing at 1 liter/minute. The resultant sintered body was immersed in a 5 mass % ammonium persulfate aqueous solution and a 1 mass % anthraquinone sulfonate aqueous solution, which had been separately prepared. Subsequently, the sintered body was removed from the solutions, and further exposed to pyrrole vapor. This procedure was carried out at least five times to form a polypyrrole second electrode on the above dielectric layer. Thereafter, a chip capacitor was produced in a manner similar to that described in Example 1. Table 2 shows the capacitance and LC of the capacitor, and the spike noise generation ratio after a high-temperature load test.

Examples 7 through 10, Comparative Example 3

The procedure of Example 5 was repeated, except that the niobium ingot was pulverized for two hours in the pot after introduction of hydrogen to obtain niobium powder having a means particle size of 1 μm. Moreover, the procedure of Example 5 was repeated, except that the niobium powder was granulated at 1,050° C. to produce granules having a mean particle size of 140 μm. The oxygen content of the granules was 25,000 ppm. The granules for each Example were subjected to nitridation at the temperature shown in Table 1 for three hours. In addition, the procedure of Example 5 was repeated, except that the sintering temperature was changed to 1,150° C. to carry out shaping, sintering, formation to produce a capacitor. The capacitance and LC of the sintered body, the capacitance and LC of the capacitor, and the spike noise generation ratio after a high-temperature load test were measured. The results are shown in Tables 1 and 2.

The amount (unit: ppm) of each element (M) contained in the niobium powder for each Example was measured through atomic absorption spectrometry. The results are shown in Table 3.

TABLE 1

| | Nitridation Temperature (° C.) | Nitrogen content (ppm) | Nitrogen/Oxygen (mass ratio) | Capacitance (μF) | LC (μA) |
|---|---|---|---|---|---|
| Ex. 1 | 250 | 300 | 1/40 | 190 | 4.0 |
| Ex. 2 | 300 | 1000 | 1/12 | 190 | 1.0 |
| Ex. 3 | 500 | 6000 | 1/2 | 190 | 1.2 |
| Ex. 4 | 700 | 8500 | 1/1.4 | 190 | 2.8 |
| Ex. 5 | 300 | 3000 | 1/10 | 510 | 2.4 |
| Ex. 6 | 400 | 6000 | 1/5 | 510 | 2.9 |
| Ex. 7 | 250 | 1000 | 1/25 | 400 | 1.0 |
| Ex. 8 | 300 | 2000 | 1/13 | 400 | 1.0 |
| Ex. 9 | 400 | 5000 | 1/5 | 400 | 2.1 |
| Ex. 10 | 500 | 8000 | 1/3.1 | 400 | 3.9 |
| Comp. Ex. 1 | 200 | 250 | 1/48 | 190 | 4.2 |
| Comp. Ex. 2 | 200 | 450 | 1/67 | 510 | 8.0 |
| Comp. Ex. 3 | 200 | 400 | 1/63 | 400 | 7.2 |

TABLE 2

| | Capacitor characteristics | | Spike noise generation ratio |
|---|---|---|---|
| | Capacitance/μF | Leakage current/μA | |
| Ex. 1 | 168 | 4.2 | 0/20 |
| Ex. 2 | 169 | 1.1 | 0/20 |
| Ex. 3 | 172 | 1.4 | 0/20 |
| Ex. 4 | 171 | 2.9 | 0/20 |
| Ex. 5 | 447 | 2.6 | 0/20 |
| Ex. 6 | 450 | 3.0 | 0/20 |
| Ex. 7 | 341 | 1.2 | 0/20 |
| Ex. 8 | 342 | 1.2 | 0/20 |
| Ex. 9 | 338 | 2.4 | 0/20 |
| Ex. 10 | 338 | 4.1 | 0/20 |
| Comp. Ex. 1 | 170 | 4.5 | 2/20 |
| Comp. Ex. 2 | 445 | 8.2 | 1/20 |
| Comp. Ex. 3 | 338 | 7.5 | 2/20 |

TABLE 3

| | Element M content (ppm) | | | | | | | |
|---|---|---|---|---|---|---|---|---|
| | Fe | Ni | Co | Si | Na | K | Mg | Total |
| Ex. 1 | 60 | 30 | 20 | 60 | 10 | 50 | 20 | 250 |
| Ex. 2 | 60 | 30 | 20 | 60 | 10 | 50 | 20 | 250 |
| Ex. 3 | 60 | 30 | 20 | 60 | 10 | 50 | 20 | 250 |
| Ex. 4 | 60 | 30 | 20 | 60 | 10 | 50 | 20 | 250 |
| Ex. 5 | 40 | 20 | 10 | 40 | 5 | 5 | 5 | 125 |
| Ex. 6 | 40 | 20 | 10 | 40 | 5 | 5 | 5 | 125 |
| Ex. 7 | 20 | 10 | 10 | 40 | 5 | 5 | 5 | 95 |
| Ex. 8 | 20 | 10 | 10 | 40 | 5 | 5 | 5 | 95 |
| Ex. 9 | 20 | 10 | 10 | 40 | 5 | 5 | 5 | 95 |
| Ex. 10 | 20 | 10 | 10 | 40 | 5 | 5 | 5 | 95 |
| Comp. Ex. 1 | 60 | 30 | 20 | 60 | 10 | 50 | 20 | 250 |
| Comp. Ex. 2 | 40 | 20 | 10 | 40 | 5 | 5 | 5 | 125 |
| Comp. Ex. 3 | 20 | 10 | 10 | 40 | 5 | 5 | 5 | 95 |

As shown in Tables 1 and 2, comparison between Examples 1 through 10 and Comparative Examples 1 through 3 reveals that, when a capacitor is produced from niobium powder in which the mass ratio of the nitrogen content to the oxygen content is about 1/45 or more, the resultant capacitor exhibits excellent reliability.

According to the present invention, when niobium powder which has undergone partial oxidation and partial nitridation, in which the mass ratio of the nitrogen content to the oxygen content is about 1/45 or more, is employed as a raw material for producing a capacitor, the resultant capacitor exhibits high reliability; i.e., no spike noise is generated during a reliability test (high-temperature load test) of the capacitor.

Even when niobium having high affinity to oxygen is employed, reliability of the resultant capacitor is considerably enhanced compared with conventional niobium capacitors when the oxygen content of the niobium is regulated to fall within the above range.

While the invention has been described in detail and with reference to specific embodiments thereof, it will be apparent to one skilled in the art that various changes and modifications can be made therein without departing from the spirit and scope thereof.

What is claimed is:

1. Niobium powder comprising niobium, nitrogen and oxygen, which has undergone partial oxidation and partial nitridation, wherein a mass ratio of a content of nitrogen in the powder to that of oxygen in the powder is about 1/45 or more, and said niobium powder containing oxygen in an amount of about 5,000 to about 60,000 ppm.

2. Niobium powder according to claim 1, wherein the nitrogen content is about 300 mass ppm to about 9,000 mass ppm.

3. Niobium powder according to claim 1 or 2, wherein a mean particle size of the powder is about 0.05 μm to about 3 μm.

4. Granulated niobium powder obtained through granulation of niobium powder as claimed in claim 3.

5. A sintered body comprising niobium powder as claimed in claim 1 or 2.

6. A capacitor comprising a sintered body as claimed in claim 5 serving as a first electrode, a dielectric formed thereon, and a second electrode.

7. A capacitor according to claim 6, wherein the dielectric is niobium oxide.

8. A capacitor according to claim 7, wherein the niobium oxide is formed through electrolytic oxidation.

9. A capacitor according to claim 6, wherein the second electrode is formed from at least one material selected from the group consisting of an electrolyte, an organic semiconductor, and an inorganic semiconductor.

10. A capacitor according to claim 6, wherein the second electrode is formed from at least one organic semiconductor selected from the group consisting of an organic semiconductor comprising benzopyrroline tetramer and chloranyl, an organic semiconductor predominantly comprising tetrathiotetracene, an organic semiconductor predominantly comprising tetracyanoquinodimethane, and an organic semiconductor predominantly comprising a conductive polymer in which a dopant is doped in a polymer including two or more repeating units represented by the following formula (1) or (2):

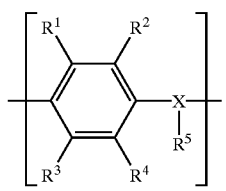

(1)

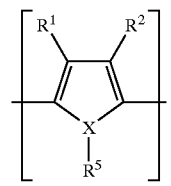

(2)

wherein each of $R^1$ through $R^4$, which may be identical to or different from one another, represents hydrogen, a C1–C6 alkyl group, or a C1–C6 alkoxy group; X represents an oxygen, sulfur, or nitrogen atom; $R^5$, which is present only when X is a nitrogen atom, represents hydrogen or a C1–C6 alkyl group; and $R^1$ and $R^2$, and $R^3$ and $R^4$ may be bonded to each other to form a cyclic structure.

11. A capacitor according to claim 9, wherein the organic semiconductor is at least one species selected from the group consisting of polypyrrole, polythiophene, and a substituted derivative thereof.

* * * * *